United States Patent
Mori et al.

[11] Patent Number: 5,932,685
[45] Date of Patent: Aug. 3, 1999

[54] HEAT-SHRINKABLE POLYESTER FILMS

[75] Inventors: Kuniharu Mori; Norimi Tabota, both of Inuyama; Koji Yamada; Shigeji Konagaya, both of Otsu; Tsutomu Oko, Inuyama; Hiroaki Esaki, Inuyama; Seizo Takabayashi, Inuyama; Shinichiro Okumura, Osaka; Tsutomu Isaka, Osaka, all of Japan

[73] Assignee: Toyo Boseki Kabushiki Kaisha, Osaka, Japan

[21] Appl. No.: 08/918,387

[22] Filed: Aug. 26, 1997

[30] Foreign Application Priority Data

Aug. 30, 1996 [JP] Japan ................................. 8-248696
Jul. 1, 1997 [JP] Japan ................................. 9-175418

[51] Int. Cl.⁶ .......................................................... C08G 63/20
[52] U.S. Cl. ............................ 528/272; 428/347; 428/349
[58] Field of Search ..................................... 428/346, 347, 428/349, 357, 221, 338, 339

[56] References Cited

U.S. PATENT DOCUMENTS

| | | |
|---|---|---|
| 3,903,294 | 9/1975 | Abella . |
| 4,439,258 | 3/1984 | Toma et al. .............................. 156/86 |
| 4,814,426 | 3/1989 | Utsumi et al. .......................... 528/272 |
| 4,985,538 | 1/1991 | Fukuda et al. ......................... 528/305 |
| 4,996,291 | 2/1991 | Yoshinaka et al. ..................... 528/272 |
| 5,070,180 | 12/1991 | Fukuda et al. .......................... 528/272 |
| 5,079,051 | 1/1992 | Garland et al. ......................... 428/34.9 |
| 5,232,767 | 8/1993 | Hisazumi et al. ....................... 428/213 |
| 5,270,390 | 12/1993 | Shibuya et al. ......................... 525/173 |
| 5,336,549 | 8/1994 | Nishimoto et al. ..................... 428/213 |
| 5,340,624 | 8/1994 | Sublett et al. .......................... 428/35.8 |
| 5,707,751 | 1/1998 | Garza et al. ............................. 428/515 |

FOREIGN PATENT DOCUMENTS

| | | |
|---|---|---|
| 0 532 943 | 3/1993 | European Pat. Off. . |
| A 63-309424 | 12/1988 | Japan . |
| A 1-110931 | 4/1989 | Japan . |
| A 4-170437 | 6/1992 | Japan . |
| WO 95/14734 | 6/1995 | WIPO . |

*Primary Examiner*—Samuel A. Acquah
*Attorney, Agent, or Firm*—Leydig, Voit & Mayer, Ltd.

[57] ABSTRACT

Heat-shrinkable polyester films having a heat shrinkability of 30% or more, preferably 40% or more, in the direction of major shrinkage after treatment in hot water at 80° C. for 30 seconds, the ratio of heat shrinkability in the direction of major shrinkage after treatment in hot water at 80° C. for 5 seconds to heat shrinkability in the direction of major shrinkage after treatment in hot water at 80° C. for 30 seconds being 0.8 or less, preferably 0.7 or less. The heat-shrinkable polyester films are suitable for label applications because of their particular heat-shrinkable properties such that not only do they scarcely cause longitudinal sinking when shrunk but also they have very few wrinkles, shrinkage spots and strains remaining after shrinkage.

3 Claims, 1 Drawing Sheet

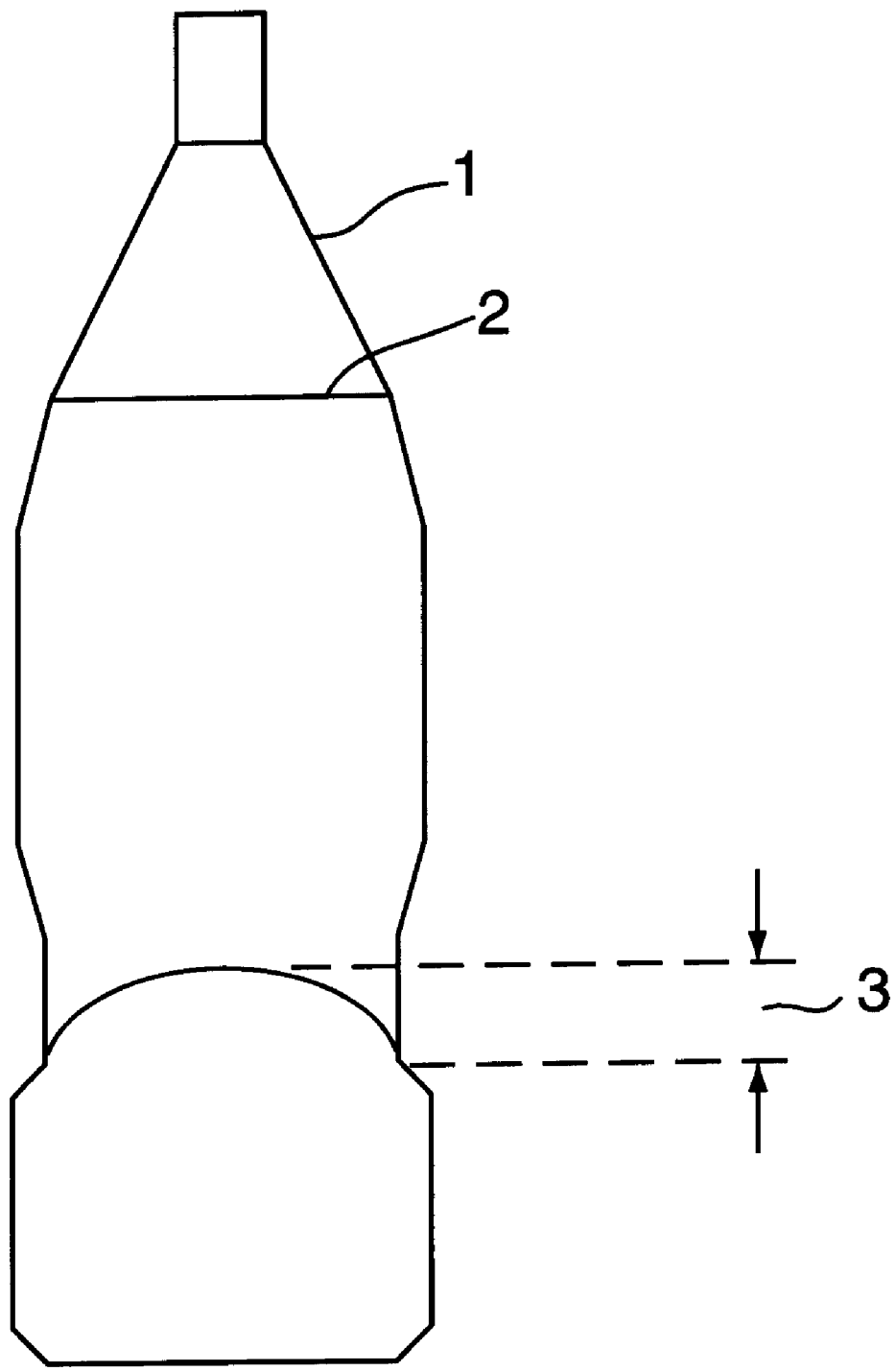
FIGURE

HEAT-SHRINKABLE POLYESTER FILMS

FIELD OF INVENTION

The present invention relates to heat-shrinkable polyester films, and more particularly, it relates to heat-shrinkable polyester films suitable for label applications because of their particular heat-shrinkable properties such that not only do they scarcely cause longitudinal sinking when shrunk but also they have very few wrinkles, shrinkage spots and strains remaining after shrinkage.

BACKGROUND OF THE INVENTION

The conventional heat-shrinkable films, particularly such as used for labels to be wrapped around the bodies of bottles, have been made mainly of polyvinyl chloride, polyethylene or other polymers. In recent years, however, it has been pointed out that these polymers have some drawbacks; for example, polyvinyl chloride evolves chlorine-containing gases in the burning for waste disposal and polyethylene is difficult to effect the printing of labels. Furthermore, when polyethylene terephthalate (PET) bottles having the labeling printed on the heat-shrinkable films are recovered for recycle use, such labels as made of resins other than PET should be separated from the PET bottles. For these reasons, heat-shrinkable polyester films have attracted much attention.

Most of the conventional heat-shrinkable polyester films, however, suddenly shrink by heat treatment, and they have wrinkles, shrinkage spots and strains remaining after shrinkage; therefore, they cannot be considered satisfactory shrinkable films for label applications.

To solve some of these defects, JP-A 1-110931/1989 discloses a method for improving the finish of shrinkage of polyester films by remarkably reducing their elongation at break in the direction perpendicular to the major shrinkage.

The polyester films obtained by this method, however, have poor utility as shrinkable films for label applications because not only do they easily break under tension applied in the printing, labeling or other steps but also the rupture of labels easily occurs during the ordinary transport of bottles as filled with contents.

JP-A 63-309424/1985 discloses a method for obtaining heat-shrinkable polyester films with improved finish of shrinkage by controlling their shrinkable properties at 75° C.

JP-A 4-170437/1992 discloses a heat-shrinkable polyester film formed from a polymer blend of polybutylene terephthalate and polyethylene naphthalate.

The polyester films obtained by these methods are, however, still unsatisfactory as shrinkable films for label applications. PET bottles, which are mainly used for beverage vessels in recent years, have been rapidly changed from the conventional round type to the square type in view of their storage in the refrigerator as disclosed in JP-A 63-309424/1988 and JP-A 4-170437/1992. When tube-shaped labels made of heat-shrinkable polyester films are fitted around the bodies of square bottles, such a defect easily occurs that the films on the flat portions other than on the corners of the bottles are curved in arch shape after shrinkage (herein referred to as "longitudinal sinking"). Taking into consideration the fact that square PET bottles are being mainly used for beverage vessels, heat-shrinkable polyester films scarcely causing longitudinal sinking when used as display labels for such bottles should be developed.

In addition to these favorable properties for label applications, they are further required to have high transparency, better color development of ink and improved finish of shrinkage, i.e., very few wrinkles, shrinkage spots and strains remaining after shrinkage.

SUMMARY OF THE INVENTION

Under these circumstances, the present inventors have intensively studied to obtain heat-shrinkable polyester films with excellent properties such as described above, thereby completing the present invention.

Thus, the present invention provides heat-shrinkable polyester films having a heat shrinkability of 30% or more, preferably 40% or more, in the direction of major shrinkage after treatment in hot water at 80° C. for 30 seconds, the ratio of heat shrinkbility in the direction of major shrinkage after treatment in hot water at 80° C. for 5 seconds to heat shrinkability in the direction of major shrinkage after treatment in hot water at 80° C. for 30 seconds being 0.8 or less, preferably 0.7 or less.

In a preferred embodiment, the heat-shrinkable polyester films further have a heat shrinkability of 10% or less in the direction perpendicular to the major shrinkage after treatment in hot water at 80° C., the heat shrinkability only taking a maximum value in the treatment for 30 seconds or shorter.

BRIEF DESCRIPTION OF THE DRAWING

The FIGURE attached hereto is a side view showing the longitudinal sinking after shrinkage of a heat-shrinkable film wrapped around the body of a PET bottle.

DETAILED DESCRIPTION OF THE INVENTION

The heat-shrinkable polyester films of the present invention may be prepared, for example, from naphthalate-type polyesters containing repeating units of butylene naphthalate and ethylene naphthalate. Preferred naphthalate-type polyesters are mixtures of polybutylene naphthalate or polybutylene naphthalate-terephthalate copolymers with polyethylene naphthalate or polyethylene naphthalate-terephthalate copolymers; and polyethylene-polybutylene/naphthalate-terephthalate copolymers.

The naphthalate-type polyesters used for the heat-shrinkable polyester films of the present invention may further contain one or more known acids as additional acid monomers other than terephthalic acid and naphthalenedicarboxylic acid, such as oxalic acid, malonic acid, succinic acid, adipic acid, azelaic acid, sebacic acid, isophthalic acid and other dimer acids, and/or one or more known diols as additional glycol monomers other than ethylene glycol and butanediol, such as propylene glycol, neopentyl glycol, hexamethylene glycol, 1,4-cyclohexanedimethanol and other dimer acid diols. To obtain heat-shrinkable polyester films with particularly excellent finish of shrinkage, the use of polyesters containing neopentyl glycol as the balance of glycol monomers is preferred.

The heat-shrinkable polyester films of the present invention may also be prepared, for example, from polyesters consisting of dicarboxylic acid monomers and polyhydric alcohol monomers containing at least one dimer diol monomer, particularly polyesters consisting of dicarboxylic acid monomers containing at least one naphthalenedicarboxylic acid monomer and polyhydric alcohol monomers containing at least one dimer diol monomer, more preferably polyesters consisting of dicarboxylic acid monomers containing at least one naphthalenedicarboxylic acid monomer as well as at least one terephthalic acid monomer and polyhydric alcohol monomers containing at least one dimer diol monomer.

When two or more different polyesters are used together, they may preferably be mixtures of polyesters (A) consisting of dicarboxylic acid monomers containing at least one naphthalenedicarboxylic acid monomer and polyesters (B) consisting of dicarboxylic acid monomers containing at least one terephthalic acid monomer, at least one of which polyesters has polyhydric alcohol monomers containing at least one dimer diol monomer.

The dimer diols, which are essential monomers of the polyesters available for the heat-shrinkable polyester films of the present invention, are $C_{36}$ dimer acid derivatives and mixtures consisting of the major components of formulas I and II:

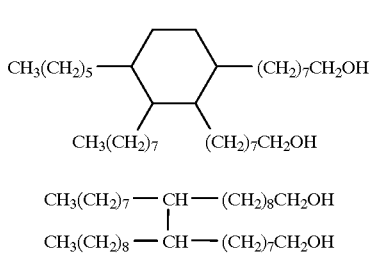

wherein both components I and II are of the saturated type. The preferred composition ratio is at a ratio of from 10:90 to 90:10 by mol %. The dimer diols are preferably purified by water washing. The polyester films prepared from these dimer diols are suitable for wrapping materials because of their reduced discoloration.

These polyesters can be prepared by the conventional methods, for example, by direct reaction of an aromatic dicarboxylic acid with a glycol, or by ester interchange of an aromatic dicarboxylic acid alkyl ester with a glycol and then polycondensation, or by polycondensation of an aromatic dicarboxylic acid diglycol ester.

Furthermore, the polyesters used for the heat-shrinkable polyester films of the present invention may preferably contain inorganic or organic lubricants to improve the slip properties of the films. When necessary, other additives may also be added, such as stabilizers, colorants, antioxidants, antifoaming agents and antistatic agents.

The heat-shrinkable polyester films of the present invention should have a heat shrinkability of 30% or more in the direction of major shrinkage after treatment in hot water at 80° C. for 30 seconds, the ratio of heat shrinkability in the direction of major shrinkage after treatment in hot water at 80° C. for 5 seconds to heat shrinkability in the direction of major shrinkage after treatment in hot water at 80° C. for 30 seconds being 0.8 or less.

If the heat shrinkability after treatment for 30 seconds is less than 30%, the resulting film exhibits insufficient shrinkage when shrunk as a label, so that it cannot fully adhere to a vessel or it is liable to have wrinkles remaining after shrinkage, which is not preferred.

If the ratio of heat shrinkability after treatment for 5 seconds to the heat shrinkability after treatment for 30 seconds exceeds 0.8, the resulting film easily causes longitudinal sinking when shrunk as a label on square bottles.

The heat shrinkability in the direction perpendicular to the major shrinkage of the heat-shrinkable polyester films of the present invention is not particularly limited but preferred to be 10% or less after treatment in hot water at 80° C. and take only a maximum value in the treatment for 30 seconds or shorter.

If the heat shrinkability in the direction perpendicular to the major shrinkage exceeds 10%, the resulting films have increased strain on the printed pattern when shrunk as a label, which is not preferred. If the heat shrinkability has no maximum value, i.e., if the heat shrinkability decreases monotonously, the resulting films are liable to have traverse wrinkles when shrunk as a label, which is not preferred; and in contrast, if the heat shrinkability increases monotonously, the resulting films have increased strain on the printed pattern when shrunk as a label, which is not preferred.

The heat-shrinkable polyester films of the present invention can be prepared, for example, by the following method. A polyester as the starting material is dried with a dryer such as a hopper dryer or a paddle dryer, or in a vacuum dryer, and then extruded at a temperature of 200° to 300° C. The extrusion may be carried out by any of the methods known in the art, such as T-die extrusion method or tubular extrusion method. Rapid cooling after the extrusion gives an unstretched film, which is then stretched.

The heat-shrinkable polyester films for practical use may preferably cause the major shrinkage in the transverse direction (TD); therefore, the following will describe only the production of such films. Even in the case of films which may cause the major shrinkage in the machine direction (MD), however, such films can also be produced in the same manner as described below, except that the direction of stretching is turned by 90 degrees.

To obtain a heat-shrinkable polyester film having a uniform thickness, the unstretched film is preferably preheated to a prescribed film temperature by hot air at a low flow rate with a heat transfer coefficient of 0.0013 cal/cm²/sec/° C. or lower.

The preheated film is stretched at a ratio of from 2.5 to 6.0, preferably from 3.0 to 5.5, in the transverse direction with a tenter at a temperature of from Tg−20° C. to Tg+40° C. where "Tg" means the glass transition temperature of the polyester used. In addition to the monoaxial stretching in the transverse direction, the film may be further stretched at a lower ratio in the machine direction. Such biaxial stretching may be carried out sequentially or simultaneously. When necessary, further stretching may be applied to the stretched film.

To control the development of heat in the film by stretching and reduce the irregularity of film temperature in the transverse direction, the heat transfer coefficient in the stretching step may be 0.0009 cal/cm²/sec/° C. or higher, preferably from 0.0011 to 0.0017 cal/cm²/sec/° C.

The stretched film is then heat treated at a temperature of from 70° to 100° C., while making 3% to 15% elongation, resulting in a heat-shrinkable polyester film.

In this manner, the heat-shrinkable polyester films of the present invention having particular heat-shrinkable properties such that not only do they scarcely cause longitudinal sinking when shrunk but also they have very few wrinkles, shrinkage spots and strains remaining after shrinkage can be obtained.

The present invention will be further illustrated by the following Examples and Comparative Examples, which are not to be construed to limit the scope thereof.

The starting material polyesters and the resulting heat-shrinkable polyester films were evaluated by the following methods.

(1) Heat Shrinkability

A heat-shrinkable polyester film was cut into a square piece having a size of 10 cm×10 cm, which was then stretched by heat treatment in hot water at a prescribed temperature ±0.5° C. under no load for 10 seconds. After the stretching, the square piece was measured for two dimensions in the machine and transverse directions, and heat shrinkability was calculated by the following equation. The direction of major shrinkage was defined as the direction in which the film had higher heat shrinkability.

Heat shrinkability =

$$\frac{\text{Dimension before shrinkage} - \text{Dimension after shrinkage}}{\text{Dimension before shrinkage}} \times 100(\%)$$

(2) Finish of Shrinkage

A label was prepared by printing three colors on a heat-shrinkable polyester film with green, gold and white inks from Toyo Ink Mfg. Co., Ltd., and then wrapped on the body of a round PET bottle, which was the same as used for "Oolog Tea" commercially available from Suntory Limited. The PET bottle having the printed label was allowed to pass through a steam tunnel (model SH-1500-L from Fuji Astec Inc.) in 10 seconds to make the label shrunk. The first and second zones in the steam tunnel were at 75° C. and 85° C., respectively. The number of samples was 10.

The finish of shrinkage of the label on the bottle was evaluated by visual observation and ranked under the following criteria: ○, no wrinkles, no color shading, and sufficient shrinkage; Δ, color shading; and X, crater-like wrinkles or insufficient shrinkage.

(3) Longitudinal Sinking

A label was prepared by printing three colors on a heat-shrinkable polyester film with green, gold and white inks from Toyo Ink Mfg. Co., Ltd., and then wrapped on the body of a square PET bottle, which was the same as used for "Minami-Alps Tennensui" commercially available from Suntory Limited. The PET bottle having the printed label was allowed to pass through a steam tunnel (model SH-1500-L from Fuji Astec Inc.) in 10 seconds to make the label shrunk. The first and second zones in the steam tunnel were at 80° C. and 85° C., respectively. The number of samples was 10.

The longitudinal sinking of the label on the bottle was evaluated by measuring the distance (in mm) between the lower end of the label on the flat sidewall of the bottle and the lower end of the label at the side corner of the bottle as shown in the figure.

The polyesters used in Examples and Comparative Examples were prepared by conventional ester interchange of an aromatic dicarboxylic acid or alkyl esters thereof with a glycol or glycols and then polycondensation. For example, a typical polyester used in Example 4 (hereinafter referred to as polyester G) was prepared as follow:

A reaction vessel for polymerization was charged with dimethyl naphthalate and ethylene glycol at a ratio of 1:2.2 by number of moles, to which 0.04 mol % of zinc acetate as a catalyst for ester interchange and 0.02 mol % of antimony trioxide as a catalyst for polycondensation were added. Ester interchange was allowed to proceed by ordinary procedures, and polycondensation was then effected under reduced pressure of 0.2 Torr at 280° C. to give a polyester having a reduced viscosity of 0.5.

The other polyesters were prepared in the same manner as described above, except that the composition of monomers was changed as shown in Table 1 below.

TABLE 1

| | Polyesters | | | | | | | |
|---|---|---|---|---|---|---|---|---|
| | A | B | C | D | E | F | G | H |
| Acid monomers (mol %) | | | | | | | | |
| terephthalic acid | 100 | 100 | | | | | | |
| dimethyl terephthalate | | | 8 | 8 | | 100 | | 100 |
| dimethyl naphthalate | | | 92 | 92 | 100 | | 100 | |
| Glycol monomers (mol %) | | | | | | | | |
| ethylene glycol | 100 | 70 | 100 | 50 | | | 100 | 90 |
| neopentyl glycol | | 30 | | | | | | |
| butanediol | | | | 50 | 100 | 100 | | |
| dimer diol*) | | | | | | | | 10 |

*)Available as HP-1000 from Toagosei Chemical Industry Co., Ltd.

EXAMPLE 1

A mixture of 35% by weight of polyester A, 40% by weight of polyester B, 10% by weight of polyester C and 15% by weight of polyester E as the starting material was extruded at 280° C., followed by rapid cooling, to give an unstretched film.

The unstretched film was stretched at a ratio of 2.3 at 90° C. and then at a ratio of 1.5 at 80° C. both in the transverse direction, followed by heat treatment at 90° C. for 20 seconds, resulting in a heat-shrinkable polyester film having a thickness of 45 μm.

EXAMPLE 2

A heat-shrinkable polyester film having a thickness of 45 μm was prepared in the same manner as described in Example 1, except that a mixture of 35% by weight of polyester A, 40% by weight of polyester B, 15% by weight of polyester C and 10% by weight of polyester E was used as the starting material.

EXAMPLE 3

A heat-shrinkable polyester film having a thickness of 45 μm was prepared in the same manner as described in Example 1, except that a mixture of 35% by weight of polyester A, 40% by weight of polyester B and 25% by weight of polyester D was used as the starting material.

Comparative Example 1

A heat-shrinkable polyester film having a thickness of 45 μm was prepared in the same manner as described in Example 1, except that a mixture of 35% by weight of polyester A, 40% by weight of polyester B and 25% by weight of polyester E was used as the starting material.

Comparative Example 2

A heat-shrinkable polyester film having a thickness of 45 μm was prepared in the same manner as described in Example 1, except that a mixture of 35% by weight of polyester A, 40% by weight of polyester B and 25% by weight of polyester C was used as the starting material.

Comparative Example 3

A heat-shrinkable polyester film having a thickness of 45 μm was prepared in the same manner as described in Example 1, except that a mixture of 35% by weight of polyester A, 30% by weight of polyester B, 25% by weight of polyester C and 10% by weight of polyester F was used as the starting material.

Comparative Examples 4 and 5

Two heat-shrinkable polyester films each having a thickness of 45 μm were prepared in the same manner as described in Example 1, except that no heat treatment was carried out in Comparative Example 4 or the unstretched film was stretched at a ratio of 3.5 in the transverse direction at 90° C. in Comparative Example 5.

EXAMPLE 4

A heat-shrinkable polyester film having a thickness of 45 μm was prepared in the same manner as described in Example 1, except that a mixture of 70% by weight of polyester G and 30% by weight of polyester H was used as the starting material and the unstretched film was stretched at a ratio of 4 in the transverse direction at 90° C., followed by heat treatment at 90° C. for 3 seconds and rapid cooling under 10% tension.

The results of evaluation for the heat-shrinkable polyester films obtained in Examples 1 to 4 and Comparative Examples 1 to 3 are shown in Table 2 below.

In contrast, the film of Comparative Example 1 caused much longitudinal sinking and the film of Comparative Example 2 exhibited insufficient shrinkage. Thus it can be said that both films are inferior to the films of Examples 1 to 4 in quality as heat-shrinkable polyester films for label applications. Furthermore, the films of Comparative Examples 3 to 5 did not have much effect on the remedy of longitudinal sinking.

We claim:

1. A heat-shrinkable polyester film having a heat shrinkability of 30% or more in the direction of major shrinkage after treatment in hot water at 80° C. for 30 seconds, the ratio of heat shrinkability in the direction of major shrinkage after treatment in hot water at 80° C. for 5 seconds to heat shrinkability in the direction of major shrinkage after treatment in hot water at 80° C. for 30 seconds being 0.8 or less.

2. A heat-shrinkable polyester film according to claim 1, having a heat shrinkability of 40% or more in the direction of major shrinkage after treatment in hot water 80° C. for 30 seconds, the ratio of heat shrinkability in the direction of major shrinkage after treatment in hot water at 80° C. for 5 seconds to heat shrinkability in the direction of major shrinkage after treatment in hot water at 80° C. for 30 seconds being 0.7 or less.

TABLE 2

| | Heat shrinkability | | Ratio of heat shrinkability $[HS_5/HS_{30}]^{3)}$ | Maximum heat shrinkability[4], ⊥ 80° C., ≦ 30 sec. | Evaluation in steam tunnel | |
|---|---|---|---|---|---|---|
| | 80° C., 30 sec. $[HS_{30}]^{1)}$ | 80° C., 5 sec. $[HS_5]^{2)}$ | | | Finish of shrinkage | Longitudinal sinking |
| Examples | | | | | | |
| 1 | 45% | 30% | 0.67 | 2.2% after 4 sec. | ○ | 2.8–3.2 mm |
| 2 | 47% | 18% | 0.38 | 2.7% after 4 sec. | ○ | 2.6–3.0 mm |
| 3 | 42% | 23% | 0.55 | 2.5% after 6 sec. | ○ | 2.8–3.2 mm |
| 4 | 47% | 32% | 0.68 | 2.0% after 6 sec. | ○ | 2.8–3.2 mm |
| Comparative Examples | | | | | | |
| 1 | 37% | 32% | 0.86 | none | ○ | 4.0–4.4 mm |
| 2 | 21% | 15% | 0.71 | 3.0% after 4 sec. | X | 2.6–3.2 mm |
| 3 | 44% | 37% | 0.84 | none | ○ | 3.8–4.2 mm |
| 4 | 59% | 50% | 0.85 | 2.7% after 4 sec. | ○ | 4.4–5.0 mm |
| 5 | 44% | 37% | 0.84 | 2.0% after 4 sec. | ○ | 4.2–4.6 mm |

[1)]Heat shrinkability in the direction of major shrinkage after treatment in hot water at 80° C. for 30 seconds
[2)]Heat shrinkability in the direction of major shrinkage after treatment in hot water at 80° C. for 5 seconds
[3)]Ratio of heat shrinkability in the direction of major shrinkage after treatment in hot water at 80° C. for 5 seconds to Heat shrinkability in the direction of major shrinkage after treatment in hot water at 80° C. for 30 seconds
[4)]Maximum value of heat shrinkability in the direction perpendicular to the major shrinkage in the treatment in hot water at 80° C. for 30 seconds or shorter As can be seen from Table 2, the films of Examples 1 to 4 exhibited excellent finish of shrinkage (i.e., no defects such as wrinkles and insufficient shrinkage) and they did not cause much longitudinal sinking. Thus the heat-shnnkable polyester films of the present invention have high qualityand high utility, and they are particularly suitable for use as shrinkable labels.

3. A heat-shrinkable polyester film according to claim 1, having a heat shrinkability of 10% or less in the direction perpendicular to the major shrinkage after treatment in hot water at 80° C., the heat shrinkability only taking a maximum value in the treatment for 30 seconds or shorter.

* * * * *

UNITED STATES PATENT AND TRADEMARK OFFICE
CERTIFICATE OF CORRECTION

PATENT NO. : 5,932,685
DATED : August 3, 1999
INVENTOR(S) : Mori et al.

It is certified that error appears in the above-identified patent and that said Letters Patent is hereby corrected as shown below:

In column 7, line 57: "qualityand" should read --quality and--.

Signed and Sealed this

First Day of February, 2000

Attest:

Attesting Officer

Q. TODD DICKINSON

Acting Commissioner of Patents and Trademarks